US007178639B2

(12) United States Patent
Schmalenbach

(10) Patent No.: US 7,178,639 B2
(45) Date of Patent: Feb. 20, 2007

(54) LOCKING DEVICE

(75) Inventor: Erich W. Schmalenbach, Karlsruhe (DE)

(73) Assignee: Sitema GmbH & Co. KG, Karlsruhe (DE)

( * ) Notice: Subject to any disclaimer, the term of this patent is extended or adjusted under 35 U.S.C. 154(b) by 33 days.

(21) Appl. No.: 10/974,269

(22) Filed: Oct. 27, 2004

(65) Prior Publication Data

US 2005/0087405 A1 Apr. 28, 2005

(30) Foreign Application Priority Data

Oct. 27, 2003 (DE) ................................ 103 50 225

(51) Int. Cl.
*B66C 23/80* (2006.01)
*F15B 15/26* (2006.01)
*F16B 7/14* (2006.01)

(52) U.S. Cl. ......................................... 188/67; 188/170

(58) Field of Classification Search .................. 188/67, 188/170; 92/17–19, 28
See application file for complete search history.

(56) References Cited

U.S. PATENT DOCUMENTS 2,632,425 A * 3/1953 Grover .......................... 92/28
3,643,765 A * 2/1972 Hanchen ..................... 188/170
4,311,220 A * 1/1982 Maurer ........................ 188/170
4,463,481 A 8/1984 Rastetter et al.
6,178,870 B1 * 1/2001 Takahashi ...................... 92/17
6,543,585 B2 * 4/2003 Stinson ..................... 188/71.8

FOREIGN PATENT DOCUMENTS

| | | |
|---|---|---|
| DE | 1 804 857 B | 11/1971 |
| DE | 88 04 418.1 U1 | 6/1988 |
| DE | 37 07 046 A1 | 9/1988 |
| DE | 38 11 225 A1 | 10/1989 |
| DE | 39 07 780 A1 | 9/1990 |
| DE | 41 26 897 A1 | 2/1993 |
| DE | 195 08 175 A1 | 9/1996 |
| DE | 692 15 328 T2 | 5/1997 |
| EP | 0 103 555 A1 | 3/1984 |
| EP | 0 538 962 A1 | 4/1993 |
| EP | 0 731 284 A1 | 9/1996 |

* cited by examiner

*Primary Examiner*—Christopher P. Schwartz
(74) *Attorney, Agent, or Firm*—Akin Gump Strauss Hauer & Feld, LLP

(57) ABSTRACT

A device is provided for clamping a loaded rod (2) with at least one clamping element (3), which is movably mounted on its conical outer periphery in a corresponding conical outer ring (4). The outer ring (4) is thereby axially movable in a housing (1) and is pre-stressed by springs (9) against the load direction. The pre-stressing is apportioned such that a shift of the outer ring (4) does not occur until a preset, defined load in the rod (2) is exceeded.

9 Claims, 2 dDrawing Sheets

LOCKING DEVICE

BACKGROUND OF THE INVENTION

The invention relates to a device for clamping a loaded rod by at least one clamping element acting on the periphery of the rod, wherein the clamping element is conically shaped on its outer periphery and movable in a corresponding conically shaped outer ring, such that the clamping element, when carried by the rod, is pressed against the rod in a self-reinforcing manner in the direction of the load.

Clamping devices of this type are used, for example, to lock in position lifting tables, support cylinders, theater podiums, and the like. Often, they also function as security against falling for vertical axes of machine tools or handling equipment.

Usually, the clamping devices are hydraulically or pneumatically held in the open position and become active with a decrease in pressure. In this case, the energy of the declining load is used to produce the clamping force.

A device for clamping a loaded rod is known from DE 38 11 225, having at least one clamping element acting on a periphery of the rod, the clamping element being conically shaped on its outer periphery and movably mounted in a corresponding conically shaped outer ring, such that the clamping element, when carried by the rod, is pressed in a self-reinforcing manner against the rod in the load direction. In this case, the clamping elements are carried by the rod in the direction of load when they are released, whereby the conical outer contour of the clamping elements produces a self-reinforcing static friction on the rod. The clamping elements do not run against a stop firmly attached to the housing, as long as the nominal load is not substantially exceeded. Therefore, overloads can lead to breakdown of the clamping device due to plastic deformation. This property limits the possible uses to those cases in which overloads are ruled out. For this reason, this clamping device is especially not suited to dissipate the kinetic energy of a falling mass; it blocks the clamping rod, but is not suitable for braking it.

It would be theoretically conceivable to manufacture the parts, such that a stop for the axial displacement of the clamping element is placed in just such a way that a certain clamping force is produced, above which slipping occurs. The aforementioned disadvantage would thus be avoided. However, this cannot be assured with attainable tolerance requirements in practice.

BRIEF SUMMARY OF THE INVENTION

Proceeding from this background, an object of the present invention is to develop a clamping device, which enables an exact limitation of the holding force whereby, in the event of an overload, a desired slippage of the rod takes place without damaging the clamping device, in particular, without a plastic deformation of the important parts. Furthermore, the clamping device according to the invention distinguishes itself by an economic and low tolerance-sensitive construction.

According to the invention, this object is achieved in that the outer ring surrounding the clamping elements is axially movable in the housing of the clamping device and is pre-stressed by springs against the load direction, the pre-stressing being apportioned in such a way that the outer ring is not shifted until a preset, defined load is exceeded.

This results in the following mode of operation: Until reaching the preset, defined load, generally referred to as the nominal load, the rod, when released, carries the clamping elements along without the axial shift being braked by a stop. Only when the preset load is exceeded, do the clamping elements carry the pre-stressed outer ring along, wherein the springs responsible for the pre-stressing are pressed together until the clamping elements are ultimately prevented from a further axial shift by a stop. The springs responsible for the pre-stressing thus produce a very accurately definable maximum holding force, the slippage of the rod beginning when the maximum holding force is exceeded.

There are various possibilities available to a person skilled in the art for designing the clamping elements. Advantageously, this is a conical bushing, which has one or more axial slits in its functional region. However, it is also not excluded to work with several clamping elements arranged adjacent to one another in peripheral direction.

Advantageously, the outer ring surrounding the clamping elements is in the form of a closed ring. However, it could also comprise several parts, in which case, however, care must be taken to absorb the radial forces which occur.

To ensure that the clamping element does not axially move against its stop until the preset, defined load is exceeded, it is recommended that the pre-stressing of the springs acting on the outer ring be selected slightly higher than would be required for holding the preset, defined load (nominal load). Moreover, the spring travel of the springs responsible for the pre-stressing of the outer ring is selected such that the axial shift of the outer ring does not yet press the springs into their blocking position. Instead, the aforementioned springs should produce a defined force on the outer ring and thus a defined holding or braking force on the rod, when the axial shift of the clamping element is terminated.

Fundamentally, the clamping element can move directly against the stop. Within the concept of a compact construction, however, it is recommended that a release piston responsible for releasing the clamping element be inserted.

Furthermore, it is advantageous if the outer ring surrounding the clamping elements is arranged axially spaced from the release piston or the stop, not only in the unstressed state, but also under load, whereby the clamping element is always set against the release piston. The latter results from the fact that, in the usual manner, it is loaded by spring elements in the clamping direction.

Furthermore, it is essential that the springs responsible for the pre-stressing of the outer ring are several times stronger than the spring elements acting on the clamping element.

Finally, having regard to a compact construction, it is recommended that the springs responsible for the pre-stressing be supported on a stationary ring, which simultaneously limits the travel of the release piston, namely it defines its release position.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

Figure 1:
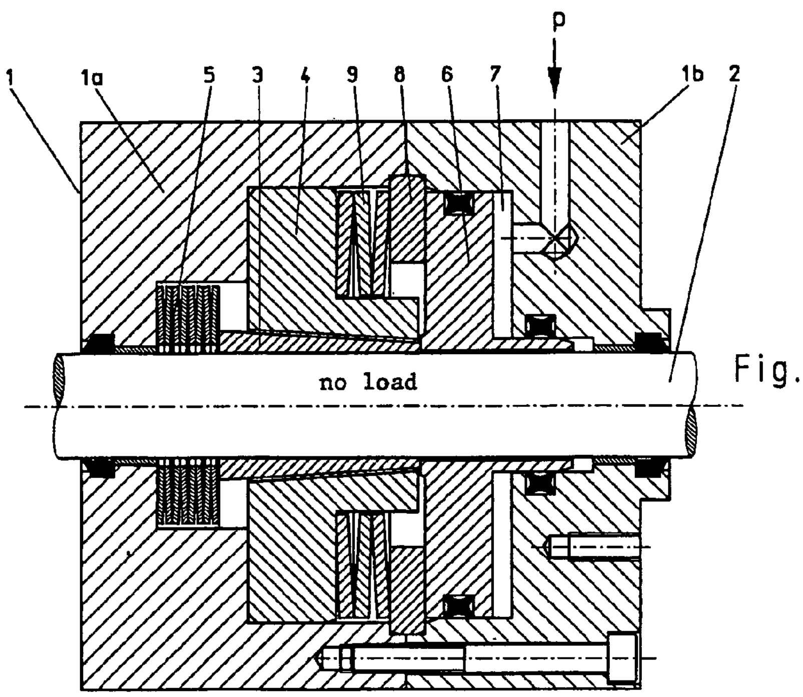
FIG. 1 is an axial section view of a clamping device according to the invention in a released state.

While loaded rods for use with the present invention are commonly vertically oriented, so that the load direction is vertically downward, i.e., by gravity, the clamping device of the invention is shown in the drawings with a horizontal rod and a horizontally acting load, for ease of illustration.

DETAILED DESCRIPTION OF THE INVENTION

A cylindrical housing 1, which comprises two axially adjacent housing parts 1*a* and 1*b*, is traversed in its center by a rod 2. The housing 1 is mounted in a stationary manner in an object (not shown) to be locked to the rod, while the rod 2 represents the movable machine element which is to be secured by the clamping device. In addition, the rod 2 is surrounded by clamping elements which, in the embodiment, have the shape of a conical clamp bushing 3 on their outer periphery. This conical clamp bushing 3 has axial slits in a known manner, so that they are flexible in a radial direction. The conical clamp bushing 3 is inserted in the inner cone of an outer ring 4, which will be discussed in greater detail below, and the conical bushing is loaded in an axial direction by a cup spring packet 5 in the clamping direction.

On its end facing away from the spring packet 5, the conical clamp bushing 3 strikes against a release piston 6, which in turn is axially movable in the housing part 1*b*. On its end facing away from the clamp bushing 3, the release piston 6 forms a cylindrical chamber 7 with the housing part 1*b*. This cylindrical chamber 7 is acted upon by a pressure medium p (e.g., compressed air or hydraulic oil) via a housing bore, so that it can move the clamp bushing 3 from its clamped or locked position toward the left. The travel of the release piston 6 is limited in the release position by a stop ring 8. This stop ring 8 advantageously sits in a recess at the transition between the two housing halves 1*a* and 1*b* and is thus axially fixed.

It is now essential that the aforementioned outer ring 4 be axially movable in the housing part 1*a* and that it be pre-stressed by springs 9, preferably a cup or disk spring packet, against the direction of load, i.e., in the sense of a clamping of the clamp bushing 3. The disk springs 9 are situated in an annular recess of the outer ring 4 and are supported on their end facing away from the outer ring on the aforementioned stop ring 8. The biasing of the disk springs 9 is selected such that they do not yield until a load is exerted on the rod 2, which is above the nominal load of the clamping device. This results in the following function:

During normal operation, the rod 2 should be able to pass the clamping device in both directions. For this purpose, the cylindrical chamber 7 is acted upon by a pressure medium p, so that the release piston 6 shifts the conical clamp bushing 3 toward the left into the release position against the spring packet 5 acting on it or holds it there. This state is shown in FIG. 1.

Figure 2:
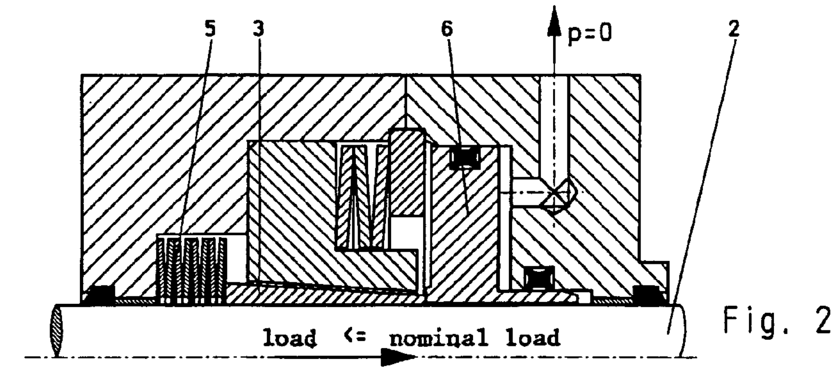
FIG. 2 is a partial axial section view of the upper part of the axial section of FIG. 1, but in the active position, wherein the load in the rod is below the nominal load.

The clamping state is engaged by switching off the pressure in the cylindrical chamber 7 (p=0 in FIG. 2). As a result, the springs 5 can shift the conical clamp bushing 3 to the right, wherein this shifting movement is assisted by the movement of the rod 2 and carries out the known self-locking clamping.

As long as the load in the rod is below the nominal load, the disk springs 9 hold the outer ring 4 in its left stop position, while the clamp bushing 3 is carried along by the rod 2 in the direction of the load. This state is shown in FIG. 2.

Figure 3:
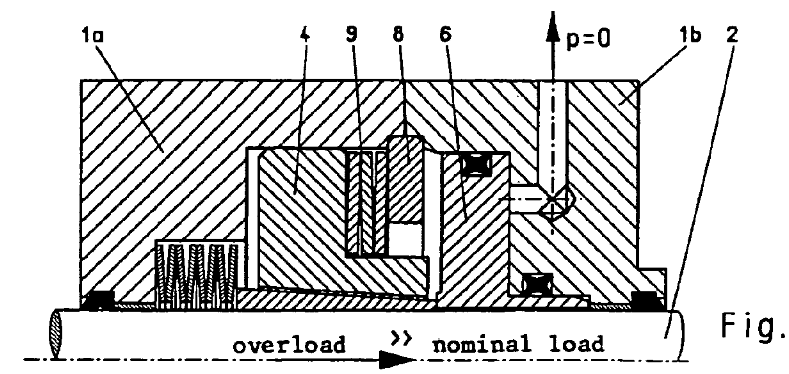
FIG. 3 is a partial axial section view corresponding to FIG. 2, but wherein the load in the rod is above the nominal load.

If the nominal load is exceeded by a certain amount, then the disk springs 9 can no longer hold the outer ring 4 in the left stop position. It is then moved to the right, together with the clamp bushing 3 and the release piston 6 adjoining it, until the release piston 6 and thus the clamp bushing 3 abuts the housing 1*b*. This state is shown in FIG. 3.

If the load in the rod 2 continues to increase, slippage takes place. However, this slippage takes place at a precisely defined braking force, in contrast to the known clamping devices. This braking force is preset by the spring force of the disk springs 9, the cone angle and the friction coefficients. On the other hand, this braking force is independent of the load in the rod 2.

Figure 4:
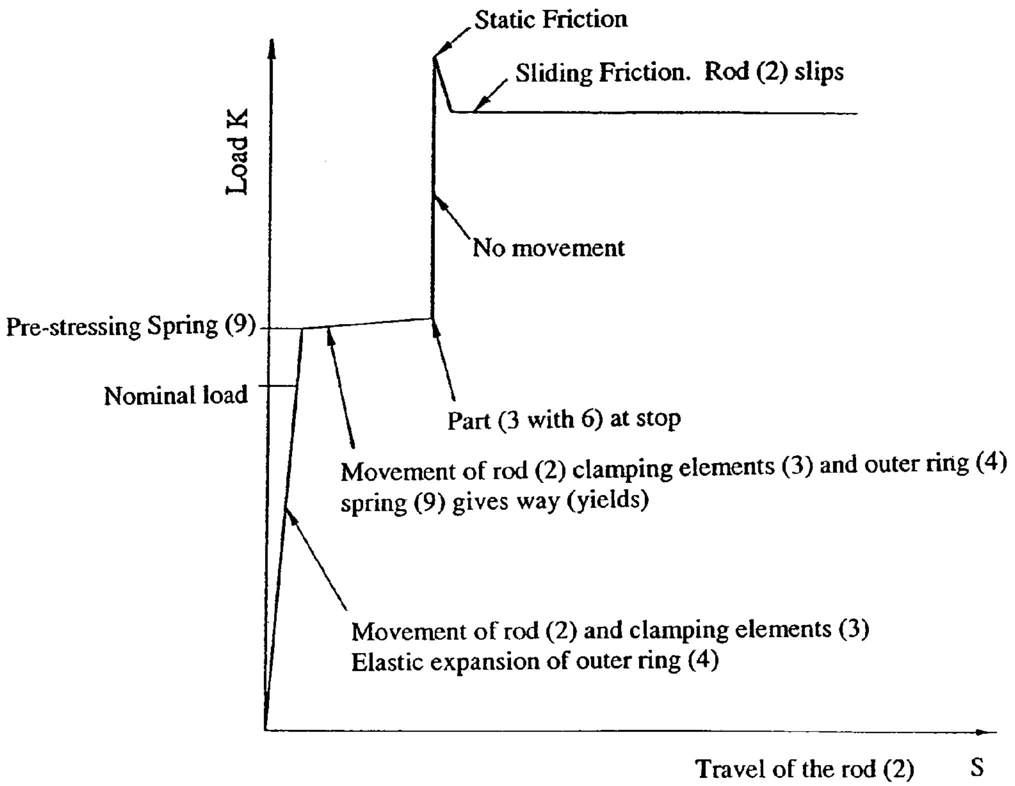
FIG. 4 is a force/travel diagram of a clamping device according to the invention.

FIG. 4 shows the associated force/travel diagram. One recognizes first a straight-line increase of the holding force until it reaches the nominal load. This part of the characteristic curve is based on the shifting of the clamp bushing 3 relative to the outer ring 4 and the resultant self-locking intensification of the clamping force.

Upon reaching the nominal load or shortly thereafter, the disk springs 9 become active. As a result, the characteristic curve here bends into a flat region, namely until the clamp bushing 3 abuts the housing 1*b* via the release piston 6, as shown in FIG. 3. With a further load increase, the holding force of the clamping device is finally exceeded, and slippage results, wherein the holding or braking force is defined by the strength of the disk springs 9. According to the invention, the braking force is thereby greater than the weight of the moved mass, and for this reason, an effective braking of the mass is assured.

In summary, the invention thus offers the advantage that a precisely defined limit of the clamping force can be pre-set, above which a desired slippage of the rod is allowed, while retaining the conventional manufacturing tolerances.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device for clamping a loaded rod (2), comprising at least one clamping element (3) acting on a periphery of the rod, the clamping element (3) being conically shaped on its outer periphery and movably mounted in a corresponding conically shaped outer ring (4), wherein the clamping element (3) is loaded in the clamping direction by spring elements (5), and such that the clamping element (3), when carried by the rod (2), is pressed in a self-reinforcing manner against the rod (2) in the load direction, wherein the outer ring (4) is axially movable in a housing (1) and is pre-stressed by springs (9) against the load direction, and wherein the pre-stressing of the springs (9) is apportioned such that an axial shift of the outer ring (4) does not occur until a preset, defined load in the rod (2) is exceeded.

2. The device according to claim 1, wherein the clamping element (3) further moves in the load direction against at least one release piston (6).

3. The device according to claim 2, wherein the outer ring (4), when under load, is arranged axially spaced from the release piston (6).

4. The device according to claim 2, wherein the clamping element (3) axially adjoins the release piston (6).

5. The device according to claim 1, wherein a theoretical travel of the springs (9) causing the pre-stressing is greater than a maximum axial shift of the outer ring (4) under load.

6. The device according to claim 1, wherein the clamping element (3) moves in the load direction against a stop in the housing (1).

7. The device according to claim 1, wherein the springs (9), which are responsible for pre-stressing the outer ring (4), are several times stronger than the spring elements (5) acting on the clamping element (3).

8. The device according to claim 1, wherein the springs (9), which are responsible for pre-stressing the outer ring (4), have a design such that a holding force produced by the springs (9) is greater than a maximum load acting on the rod (2).

9. The device according to claim 1, wherein the springs (9), which are responsible for the pre-stressing, are supported on a stationary stop ring (8) which simultaneously limits the control travel of the release piston (6) in the release position.

* * * * *